Patented Dec. 29, 1925.

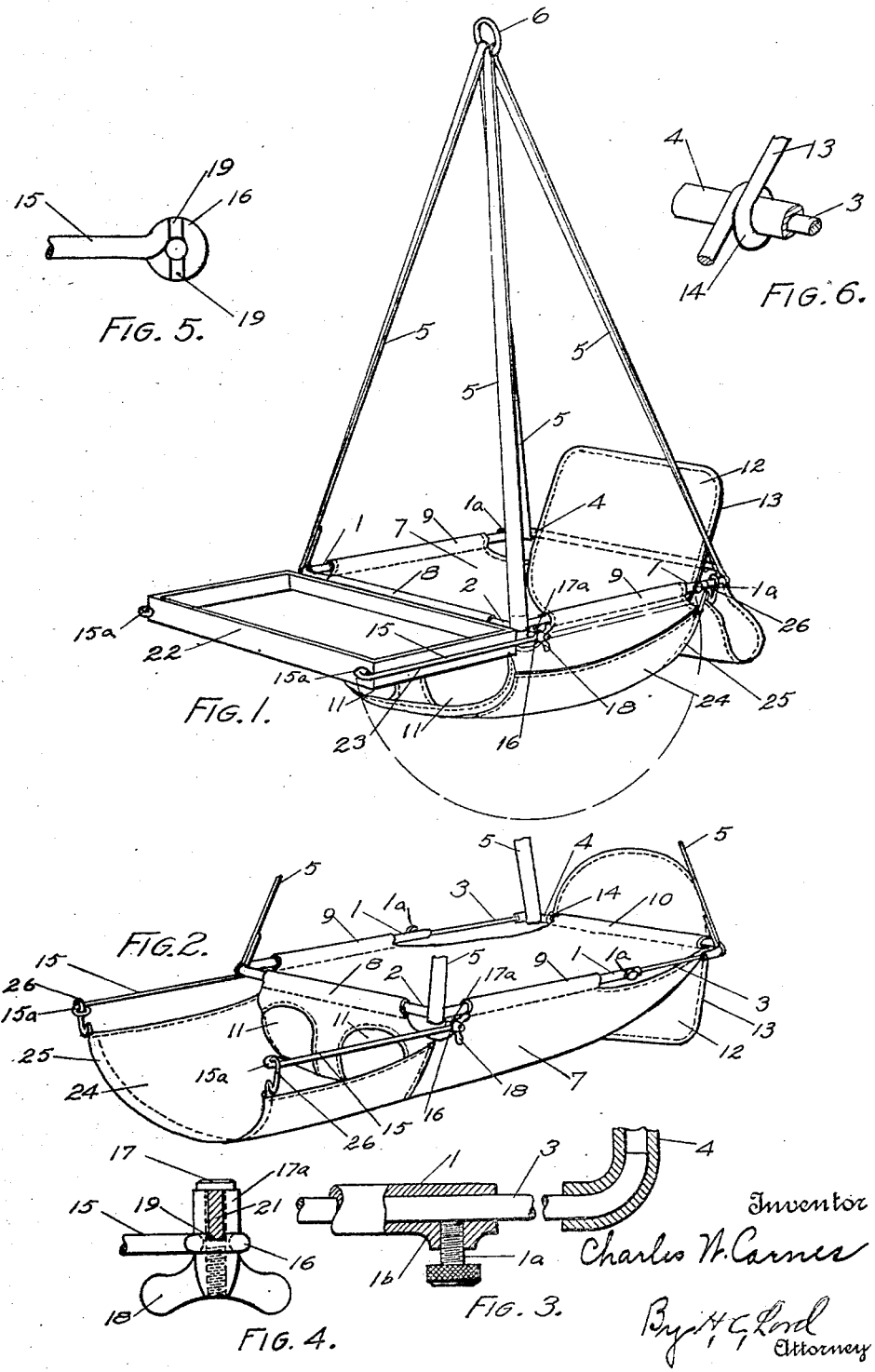

1,567,418

UNITED STATES PATENT OFFICE.

CHARLES W. CARNES, OF ERIE, PENNSYLVANIA.

CRADLE.

Application filed October 14, 1924. Serial No. 743,634.

*To all whom it may concern:*

Be it known that I, CHARLES W. CARNES, a citizen of the United States, residing at Erie, in the county of Erie and State of Pennsylvania, have invented new and useful Improvements in Cradles, of which the following is a specification.

Heretofore swinging cradles have been made but in most instances they have not been adjustable lengthwise so as to perfectly adapt them for a seat and hammock in which an infant may rest lying down. The invention also comprises features for an extension which may be put in place for holding material in convenient position to the infant seated in the device. Features of the invention will appear from the specification and claims.

The invention is illustrated in the accompanying drawings as follows:—

Fig. 1 shows a perspective view of the device contracted for a seat.

Fig. 2 a similar view elongated for reclining.

Fig. 3 a section on the line 3—3 in Fig. 2.

Fig. 4 a detail view of the extension hinge.

Fig. 5 a detail of the extension hinge.

Fig. 6 a detail of the hinge for the back.

A U-shaped frame has the rearwardly extending arms 1—1. A cross piece 2 operates telescopically with a rear frame having sides 3 and a back 4, the sides 3 operating in the sides 1. The sides 1 are provided with the set screws 1ª which operate through a slight enlargement 1ᵇ in the side pieces. The frame is suspended from straps 5 which extend from the cross pieces to a ring 6.

A bag or hammock 7 has its front end secured to the cross piece 2 at 8, the sides 1 at 9 and the rear cross piece at 10. It will readily be seen, therefore, that the sides may be readily moved together or adjusted without any particular change in the hammock, the sides 3 being free to slide in the sides 1.

Leg openings 11 are formed in the front end of the hammock so as to adapt it for a seat.

A back 12 has a frame 13 extending at the top and bottom of the cross piece 4, the frame having a loop 14 extending around the cross piece as shown in Fig. 6. The back is so shaped that it may be swung upwardly to the position shown in Fig. 1 where the device is used as a seat and may be dropped back, the lower part of the frame being sufficient to hold it upwardly when it is used as a cradle for permitting the infant to recline.

Extension rods 15 are pivotally secured at the front end of the frame. This is conveniently accomplished by forming the loops 16 in the rods and arranging them around pins 17 which extend through brackets 17ª secured to the frame 1. The pins are clamped by thumb nuts 18 and the eyes 16 have the notches 19 which engage keys 21 on the brackets 17ª. It will readily be seen that the rods 15 may be swung forward and locked by setting the screw and with the key 21 in the notch 19 the rods may be reversed and locked in the rearward position, the eye 16 having two notches as shown in Fig. 5 for engaging the key 21. A box 22 has the grooves 23 along its sides which are adapted to be engaged by the rods 15. The rods have the eyes 15ª which extend around the box and thus secure the box in place. By loosening the nuts 18 the box may be readily removed. A leg support 24 is secured at its rear end to the bag or hammock 7 and at its front end has a metal loop 25 which is connected by the links 26 with the eyes 15ª of the rods. The links 26 may be detached from the eyes and hooked over the rear frame 3 in the position shown in Fig. 1 when desired, or may be hooked to the front with the extension rods in the forward position as shown in Fig. 2, or the extension rods with the box removed may be swung directly to the rear position carrying with them the foot support 24.

What I claim as new is:

1. In a cradle, the combination of two U-shaped telescoping frame members telescopically arranged; and a hammock secured along its edges to the ends and sides of one of the U-shaped members and the end of the other of said U-shaped members and shortened and elongated by the telescoping action of the frame.

2. In a cradle, the combination of a telescoping frame; a hammock secured to the frame and shortened or elongated by the telescoping action of the frame, said hammock having leg openings at its front; and an extension secured to the front of the frame and carrying leg supporting means below the openings.

3. In a cradle, the combination of a telescoping frame; a hammock secured to the frame and shortened or elongated by the telescoping action of the frame, said hammock having leg openings at its front; and a swinging extension secured to the front of the frame and carrying leg supporting means below the openings.

4. In a cradle, the combination of a telescoping frame; a hammock secured to the frame and shortened or elongated by the telescoping action of the frame, said hammock having leg openings at its front; a swinging extension secured to the front of the frame and carrying leg supporting means below the openings; and means for locking the extension at its connection with the frame.

5. In a cradle, the combination of a telescoping frame; a hammock secured to the frame and shortened or elongated by the telescoping action of the frame, said hammock having leg openings at its front; an extension secured to the front of the frame; and a canvas detachably secured to the extension said canvas extending below the leg openings.

6. In a cradle, the combination of a telescoping frame; a hammock secured to the frame and shortened or elongated by the telescoping action of the frame, said hammock having leg openings at its front; an extension secured to the front of the frame; a canvas detachably secured to the extension said canvas extending below the leg openings; and a board detachably secured to the extension.

In testimony whereof I have hereunto set my hand.

CHARLES W. CARNES.